United States Patent
De Sa Costa et al.

(10) Patent No.: US 11,710,116 B2
(45) Date of Patent: Jul. 25, 2023

(54) METHOD FOR TRANSMITTING DATA TO TWO DISTINCT GATEWAYS, AND CORRESPONDING DEVICE

(71) Applicant: BANKS AND ACQUIRERS INTERNATIONAL HOLDING, Paris (FR)

(72) Inventors: Sylvain De Sa Costa, Valence (FR); Michaël Menardais, Saint-Menard-en-Jalles (FR); Mickael Bouyaud, Verrieres-le-Buisson (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 0 days.

(21) Appl. No.: 17/263,731

(22) PCT Filed: Jul. 24, 2019

(86) PCT No.: PCT/EP2019/069989
§ 371 (c)(1),
(2) Date: Jan. 27, 2021

(87) PCT Pub. No.: WO2020/025430
PCT Pub. Date: Feb. 6, 2020

(65) Prior Publication Data
US 2021/0374713 A1    Dec. 2, 2021

(30) Foreign Application Priority Data
Jul. 30, 2018  (FR) ...................................... 1857103

(51) Int. Cl.
*G06Q 20/02*  (2012.01)
*G06Q 20/32*  (2012.01)

(52) U.S. Cl.
CPC ....... *G06Q 20/3229* (2013.01); *G06Q 20/027* (2013.01)

(58) Field of Classification Search
None
See application file for complete search history.

(56) References Cited

U.S. PATENT DOCUMENTS 10,268,996 B1 *  4/2019  Wannamaker ....... G06Q 40/125
2001/0032192 A1*  10/2001  Putta .................. G06Q 20/3821
705/76

(Continued)

FOREIGN PATENT DOCUMENTS

WO    2007130281 A2    11/2007
WO    2007130281 A3    1/2008

(Continued)

OTHER PUBLICATIONS

English translation of the Written Opinion of the International Searching Authority dated Sep. 23, 2019 for corresponding International Application No. PCT/EP2019/069989, filed Jul. 24, 2019.

(Continued)

*Primary Examiner* — Bruce I Ebersman
*Assistant Examiner* — Matthew Cobb
(74) *Attorney, Agent, or Firm* — David D. Brush; Westman, Champlin & Koehler, P.A.

(57) ABSTRACT

In the field of payment terminals, a new generation of modular, function-rich payment terminals is appearing. Such smart payment terminals transmit, equally well, data relative to payment transactions and, for example, data relative to software updates. However, at present, a smart payment terminal in incapable of transmitting different data in accordance with their respective transmission constraints. This can represent a considerable cost for the merchant. A communications device is therefore provided to set up two (Continued)

connections simultaneously with two different gateways and thus be capable of exchanging data associated with different transmission parameters. Thus, the communications device can simultaneously transmit data relative to different types of services having distinct transmission parameters.

7 Claims, 4 Drawing Sheets

(56) References Cited

U.S. PATENT DOCUMENTS

| | | | |
|---|---|---|---|
| 2008/0256251 A1 | 10/2008 | Huotari et al. | |
| 2011/0032868 A1 | 2/2011 | Huang et al. | |
| 2013/0110719 A1* | 5/2013 | Carter | G06Q 20/351 |
| | | | 705/44 |
| 2018/0109291 A1* | 4/2018 | Peng | H04B 5/0037 |

FOREIGN PATENT DOCUMENTS

| | | |
|---|---|---|
| WO | 2010034377 A1 | 4/2010 |
| WO | WO-2012123791 A3 * | 11/2012 ........... H04B 1/3816 |

OTHER PUBLICATIONS

International Search Report dated Sep. 16, 2019 for corresponding International Application No. PCT/EP2019/069989, dated Jul. 24, 2019.

Written Opinion of the International Searching Authority dated Sep. 16, 2019 for corresponding International Application No. PCT/EP2019/069989, filed Jul. 24, 2019.

DVB Organization. "a073r1.pdf", DVB, Digital Video Broadcasting, C/O EBU—17A Ancienne Route—CH1218 Grand Saconnex, Geneva—Switzerland, Aug. 16, 2004 (Aug. 16, 2004), XP017826865.

* cited by examiner

METHOD FOR TRANSMITTING DATA TO TWO DISTINCT GATEWAYS, AND CORRESPONDING DEVICE

CROSS-REFERENCE TO RELATED APPLICATIONS

This Application is a Section 371 National Stage Application of International Application No. PCT/EP2019/069989, filed Jul. 24, 2019, which is incorporated by reference in its entirety and published as WO 2020/025430 A1 on Feb. 6, 2020, not in English.

1. FIELD OF THE INVENTION

The invention relates to the transmission of data between a communications device and a gateway interconnecting a first network, in which the communications device is situated, and a second network. More particularly, the invention relates to the simultaneous transmission of data from the communications device to two distinct networks.

2. PRIOR ART AND ITS DRAWBACKS

Figure 1:
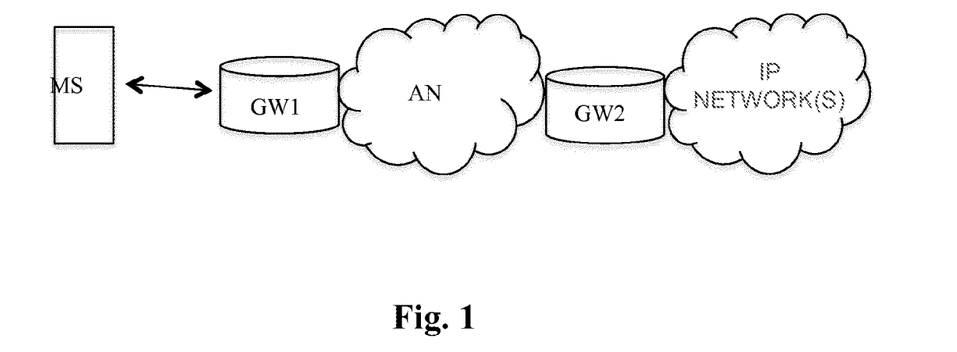
FIG. 1 schematically represents an architecture of a packet-oriented communications system according to the prior art.

FIG. 1 schematically represents an architecture of a packet-oriented communications system.

Such a system 1 comprises at least one mobile station MS, such as a mobile telephone, a smartphone, etc., and a first gateway GW1 interconnecting a radio communications network (not shown in the figure), in the radio coverage of which the mobile station MS is situated, with an access network AN. The system 1 also comprises a second gateway GW2 interconnecting the access network AN with one or more IP (Internet Protocol) networks.

When the system 1 is compliant with the standards defining 2G or 3G, namely second and third generation respectively, the first gateway GW1 is an SGSN (Serving GPRS Support Node) gateway and the second gateway GW2 is a GGSN (Gateway GPRS Support Node) type gateway.

When the system 1 is compliant with the standards defining the 4G (fourth generation) or LTE (Long Term Evolution), the first gateway GW1 is a gateway called a "Serving Gateway" and the second gateway GW2 is a gateway of the PDN (Packet Data Network) gateway type.

In order to set up a connection with a device situated in an IP network interconnected to the access network AN by the second gateway GW2, the mobile station MS initiates, classically, a procedure of attachment to the first gateway GW1.

Once this procedure of attachment is done, the mobile station MS activates a connection context defining the parameters for setting up the connection to be set up. The activation of such a context enables the mobile station MS to obtain an IP address and to define a quality of service QoS with which the transmission of data via the connection to be set up is to be done. One and the same mobile station MS can activate several different contexts.

In a system 1 compliant with the standards defining the 3G, such a context is called a PDP (Packet Data Protocol) context.

In a system 1 compliant with the standards defining the 4G, such a context is called an EPS (Evolved Packet System) context.

Such contexts are especially specified by an access point name or APN that identifies the second gateway GW2. Such an access point name is common to all the contexts activated by a given mobile station MS.

In the field of payment terminals, a novel generation of function-rich, modular payment terminals is appearing. Such payment terminals, called smart terminals, can take the form of a touchpad tablet accepting all means of payment and offering trade and business services needed for the management of a business. Since such a tablet embeds an operating system, such as for example the Android operating system, it is possible to simply and rapidly integrate trade applications such as invoicing applications for example, in addition to classic applications in such smart payment terminals and thus improve the merchant's experience.

Such smart payment terminals transmit both data relative to payment transactions and for example data relative to software updates.

The data relative to payment transactions transmitted by these payment terminals are sensitive and it is important that this transaction should be done with high reliability. It is thus important that the data transmitted should not get lost in transmission and that they should not get corrupted so that it is possible to process them.

The data relating to software updates are data for which the required reliability of the transmission is lower. The requests for connection can be rarer but the volume of the transmitted data can be consequential.

These novel payment terminals can equally well embed applications known as business applications which require the setting up of permanent connections with remote servers and which can generate a volume of exchanged data that it is hard to estimate.

However, at the present time, a smart payment terminal is not capable of transmitting these three types of data in compliance with their respective transmission constraints. Therefore, the data relating to payment transactions and the data relating to software updates or relating to "business" applications are transmitted with the same transmission parameters such as for example an identical level of quality of service or QoS, and this can represent a considerable cost for the merchant.

There is therefore a need to provide a method for transmitting data from a communications device that enables the application of simultaneous and distinct transmission constraints as a function of the type of data to be transmitted.

3. SUMMARY OF THE INVENTION

The invention meets this need by proposing a method of transmission of data implemented by a communications device situated in a first communications network, the method comprising a phase of transmission of data relative to a first type of service through a first connection set up between the communications device and the first gateway interconnecting the first communications network and a second communications network in accordance with a first set of parameters comprising an identifier of the first gateway and parameters relative to the transmission of the data relative to the first type of service, characterized in that the method comprises, during the phase of transmission, a step for setting up at least one second connection between the communications device and a second gateway interconnecting the first communications network and a third communications network in accordance with a second set of parameters comprising an identifier of the second gateway and parameters relating to the transmission of data relative to a second type of service.

Such a method of transmission enables a communications device to set up simultaneously two connections with two different gateways and thus be able to exchange data associated with two different transmission parameters.

For example, the first gateway and the second gateway are GGSN (Gateway GPRS Support Node) gateways as defined by the 3GPP (Third Generation Partnership Project) standardization organization.

The parameters relating to the transmission of data relating to a type of service are for example an access point name or APN. An access point name comprises a GGSN gateway identifier, with which a connection is set up, and parameters representing a type of service associated with the data to be transmitted.

Thus, according to the method of transmission described here above, a communications device is capable of activating two PDP contexts with two different GGSN gateways contrary to what is stipulated by the prior art.

The communications device can therefore transmit simultaneously data pertaining to different types of services having distinct transmission parameters. In other words, the communications device is capable of transferring data relative to a first type of service such as for example a best effort service through a first connection and data relative to a type of service such as for example a real-time service through a second connection.

According to one embodiment of the method of transmission, the parameters relative to the transmission of data relative to the first type of service and of data relative to the second type of service comprise at least one parameter representative of a type of service associated with the data to be transmitted.

Such a type of service is for example a real-time service or a best effort service or a service enabling the secure transmission of data, etc.

According to one embodiment of the method of transmission, the parameter representative of a type of service associated with the data to be transmitted comprises an identifier of a level of quality of service associated with the data to be transmitted.

Thus, each connection set up by the communications device is associated with a level of quality of service defined when it is set up.

According to one embodiment of the method of transmission, the parameter representative of a type of service associated with the data to be transmitted comprises an identifier of a transport protocol in accordance with which the data are to be transmitted.

Thus, each connection is set up in accordance with a given protocol such as for example RTP (Real-time Transport Protocol) or IPsec (Internet Protocol Security).

According to one embodiment of the method of transmission, the parameters relating to the transmission of the data relative to the first type of service and of data relative to the second type of service comprise at least one identifier of an operator controlling the first communications network.

According to one embodiment of the method of transmission, the parameters relative to the transmission of data relative to the first type of service and of data relative to the second type of service comprise at least one identifier of an operator controlling the first communications network.

According to one embodiment of the method of transmission, the parameters relative to the transmission of data relative to a first type of service and of data relative to a second type of service comprise at least one identifier of a slot made in the communications device and in which a SIM card is to be inserted.

In certain cases, it can be useful for the communications device to be able to use several SIM cards. In this example, it is possible to set up certain types of connections with one SIM card but not with another.

According to one embodiment of the method of transmission, the first type of service specified in the first set of parameters according to which the first connection is set up is a type of service known as a best effort service.

It is useful to have a connection associated with a type of service known as a best effort service. It is then always possible to transmit data even when it is not possible to set up a connection in accordance with the parameters relating to the transmission of said requested data.

The invention also relates to a communications device situated in a first communications network and comprising means of transmission of data relative to a first type of service through a first connection set up with a first gateway interconnecting the first communications network and a second communications network in accordance with a first set of parameters comprising an identifier of the first gateway and parameters relative to the transmission of data relative to the first type of service, characterized in that the communications device comprises means for setting up at least one second connection with a second gateway interconnecting the first communications network and a third communications network in accordance with a second set of parameters comprising an identifier of the second gateway and parameters relative to the transmission of data relative to a second type of service, the first connection being still active.

Such a device can be included in a mobile telephone, a tablet, etc.

The invention also relates to a payment terminal situated in a first communications network comprising at least one communications device comprising means of transmission of data relative to a first type of service through a first connection set up with a first gateway interconnecting the first communications network and a second communications network in accordance with a first set of parameters comprising an identifier of the first gateway and parameters relative to the transmission of data relative to the first type of service, characterized in that the communications device comprises means for setting up at least one second connection with a second gateway interconnecting the first communications network and a third communications network in accordance with a second set of parameters comprising an identifier of the second gateway and parameters relative to the transmission of data relative to a second type of service, the first connection being still active.

The invention also relates to a computer program product comprising program code instructions for the implementing of a method as described here above when it is executed by a processor.

The invention is also aimed at providing a computer-readable recording medium on which there is recorded a computer program comprising program code instructions for the execution of the steps of the method of transmission according to the invention as described here above.

Such a recording medium can be any entity or device whatsoever capable of storing the program. For example, the medium can comprise a storage means such as a ROM, for example a CD ROM or a microelectronic circuit ROM, or again a means of magnetic recording, for example a USB key or a hard-disk drive.

Besides, such a recording medium can be a transmissible medium such as an electrical or optical signal, which can be conveyed via an electrical or optical cable, by radio or by other means, so that the computer program that it contains is executable remotely. The device according to the invention can be especially downloaded onto a network for example the Internet.

As an alternative, the recording medium can be an integrated circuit into which the program is incorporated, the circuit being adapted to executing or to being used in the execution of the above-mentioned display control method.

4. LIST OF FIGURES

Other aims, features and advantages of the invention shall appear will more clearly from the following description, given by way of simple, illustrative and non-exhaustive examples, made with reference to the figures, among which.

5. DETAILED DESCRIPTION OF EMBODIMENTS OF THE INVENTION

The present invention proposes a solution enabling a communications device to set up several simultaneous connections with distinct communications networks in order to be able to transmit data according to different transmission parameters and seamlessly for a user of the communications device.

Figure 2:
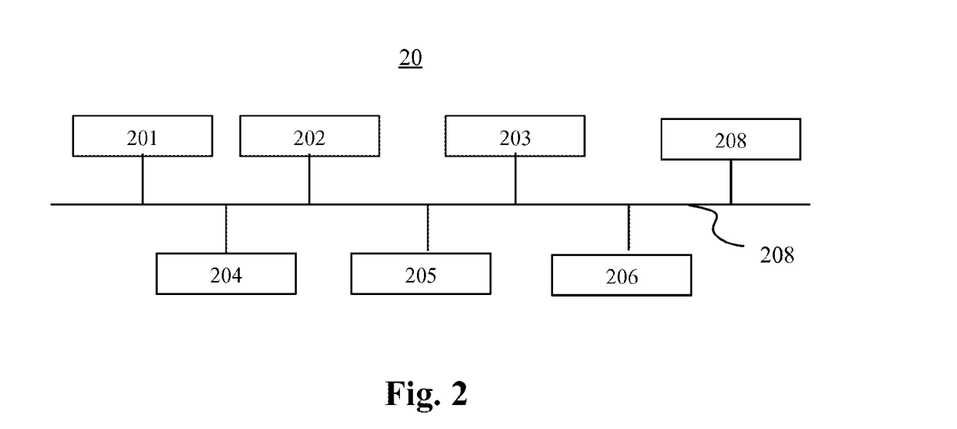
FIG. 2 represents a communications device 20 according to one embodiment of the invention.

FIG. 2 represents a communications device 20 according to one embodiment of the invention.

The communications device 20 may include at least one hardware processor 201, one storage unit 202, one input or entry device 203, one display device 204, one interface 205, at least one network interface 206, and a communications manager 207, these elements being connected to one another through a bus 208. Naturally, the constituent elements of the communications device 20 can be connected by means of a connection other than a bus.

The processor 201 controls the operations of the communications device 20. The storage unit 202 stores at least one program for implementing a method of transmission according to one embodiment of the invention and, should the communications device be embedded in a payment terminal, at least one program relating to the execution of payment transactions to be executed by the processor 201, and various pieces of data, such as parameters used for computations carried out by the processor 201, intermediate data relating to computations carried out by the processor 201, etc. The processor 201 may be formed by any known and suitable piece of hardware or software, or by a combination of hardware and software. For example, the processor 201 can be formed by a piece of dedicated hardware such as a processing circuit, or by a programmable processing unit such as a central processing unit that executes a program stored in a memory of this unit.

The storage unit 202 may be formed by any suitable means whatsoever capable of storing the program or programs and data in a computer-readable manner. Examples of the storage unit 202 include computer-readable, non-transient storage media such as semiconductor-based (solid-state) memory devices, and magnetic, optical, or magneto-optical recording media loaded into a read-and-write unit.

The input device 203 may be formed by a keypad, a pointing device such as a mouse for use by a user to enter commands. The display device 204 can also be formed by a display module, such as for example a graphic user interface or GUI. The input device 203 and the display device 204 can be formed integrally by means of a touch screen, for example.

The interface 205 provides an interface between the communications device 20 and an external apparatus such as a printer. The interface 205 can communicate with the external device via a wired connection or a wireless connection.

At least one network interface 206 provides a connection between the communications device 20 and a remote device, such as a gateway GW, via a communications network, such as the Internet. The network interface 206 can, depending on its nature, provide a wired or wireless connection to the network The communications manager 207 is controlled by the processor 201 in accordance with the instructions of the program for the implementing of a method of transmission according to one embodiment of the invention. The functioning of the communications manager 207 is explained in greater detail in relation with the steps for the implementing of a method of transmission according to one embodiment of the invention. The communications manager can be a software module or a combination of hardware and software elements.

Figure 3:
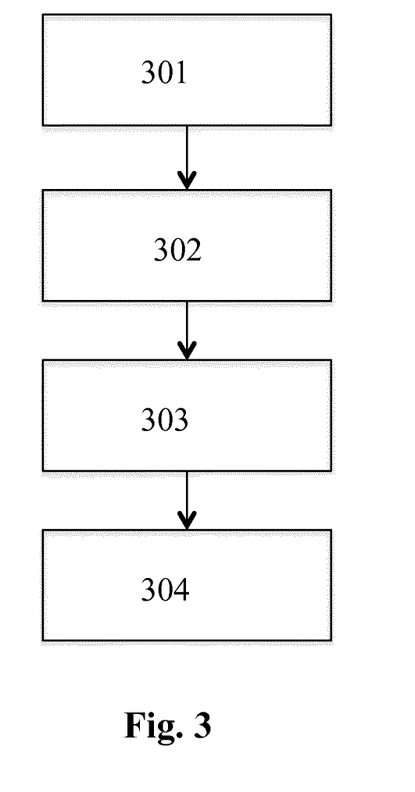
FIGS. 3, 4 and 5 represent the steps implemented during the execution of the method of transmission according to one embodiment of the invention.
Figure 4:
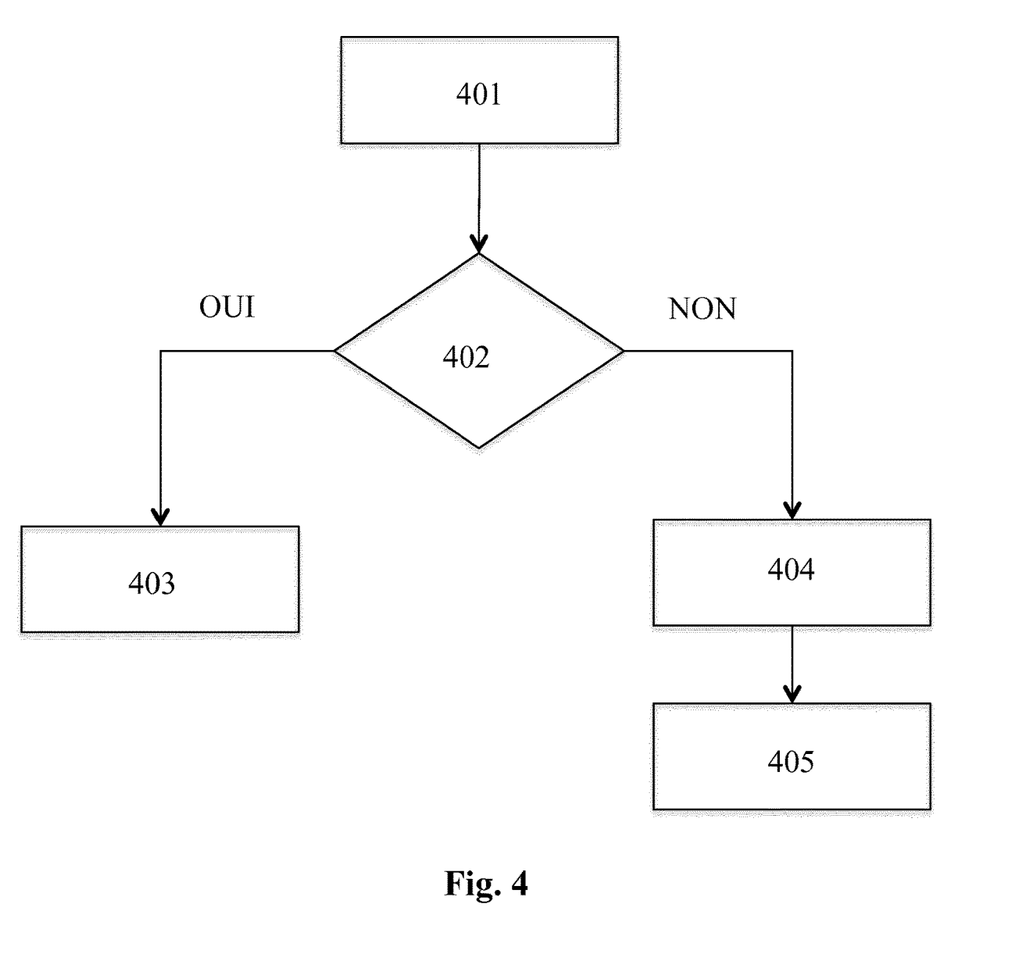
Figure 5:
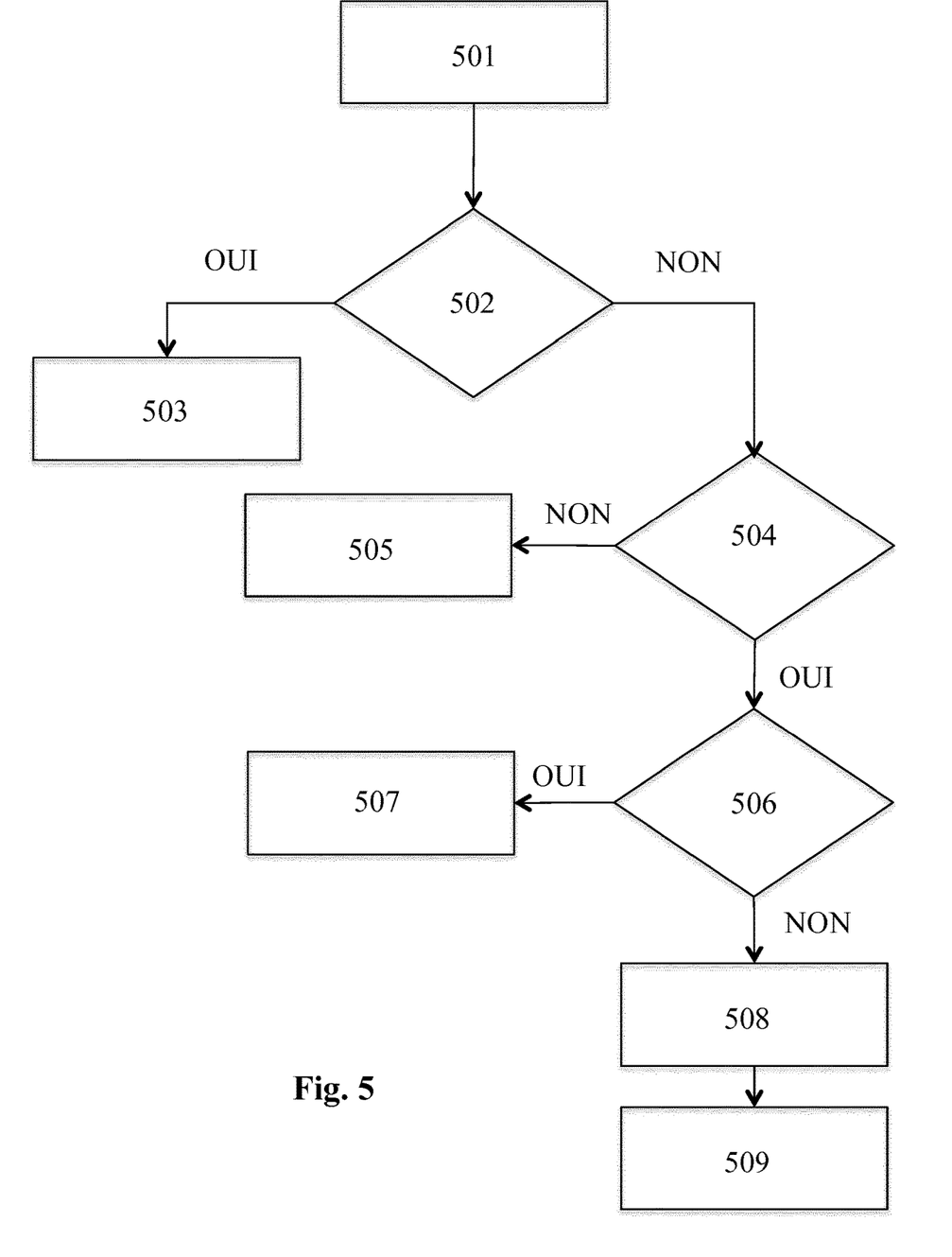

FIGS. 3, 4 and 5 represent the steps implemented during the execution of the method of transmission according to one embodiment of the invention.

With reference to FIG. 3, at a step 301, the communications manager 207 receives at least one set of parameters associated with at least one application, such as for example a payment application or an online game application, loaded into the communications device 20. Each application provides a type of service, for example a payment type service, a maintenance type service or again a default or best effort type service. The different types of services are for example associated with a score that indicates the priority to be given to the data processing associated with these different types of services. Thus, the payment type of service takes priority over the maintenance type of service and is, for example, associated with a higher score than the maintenance type.

In a first embodiment, the communications manager 207 can receive a set of parameters associated with at least one application via the input device 203. In this embodiment, a user of the communications device enters the set of parameters by hand.

In a second embodiment, the communications manager 207 can receive a set of parameters associated with at least one application during the installation of the application in the communications device 20. The set of parameters associated with the application is then transmitted to the communications manager 207 through the bus 208.

Thus, a set of parameters associated with an application comprises at least one identifier of a gateway GW with which a connection can be established in order to transmit data relating to the application and parameters relating to the transmission of data relative to the type of service provided by the application. The identifier of the gateway is for example an access point name.

The parameters relating to the transmission of data relative to the type of service provided by the application are for example an identifier of the type of service, an identifier of a transport protocol in accordance with which the data are to be transmitted or again an identifier of a level of quality of service associated with the data to be transmitted, etc.

The set of parameters associated with an application can also include an identifier of a telecommunications operator in charge of the access network in which the communications device 20 is situated, as well as information necessary for the attachment of the communications device 20 with the gateway GW. Indeed, certain applications embedded in the communications device 20 can be authorized to exchange data when the communications device 20 is affiliated with a first telecommunications operator and not be authorized to do so when the communications device 20 is affiliated with a second telecommunications operator.

The set of parameters associated with an application can comprise an identifier of a slot (not shown in the figures) made in the communications device 20 and in which a SIM card is intended to be inserted. The set of parameters associated with an application can also include elements for authenticating a user of the communications device 20 such as identifiers and a password.

A set of parameters associated with an application corresponds to a PDP context or an EPS context. Thus, a connection established between the communications device 20 and a GGSN or a PDN type gateway GW corresponds to a PDP context or to an EPS context.

At a step 302, the communications manager 207 memorizes the sets of parameters associated with an application received in a table memorized in the storage unit 202. If, for a same type of service, there are several sets of parameters associated with a different application, only the more recent set of parameters associated with an application is kept.

At a step 303, the communications manager 207 receives, for each type of service, an identifier of a network interface 206 of the communications device 20 used to set up a connection with the gateway GW identified by the access point name APN included in the set of parameters associated with an application providing the type of service in question. Such an identifier of a network interface 206 is for example its MAC (Medium Access Control) address.

Thus, at the end of the step 303, the communications manager 207 has ser up a correspondence between types of service and network interfaces 206.

At a step 304, the communications manager 207 triggers the setting up of a connection, associated with the best effort type of service between the communications device 20 and a gateway GW-Def interconnecting the access network access and an IP network, called a default connection. Such a default connection is used to transmit data sent, for example, by applications providing a default type service, or again data sent by applications for which the type of service provided is not known.

The default connection is known as a "permanent" connection, i.e. as long as the communications device is powered on and is attached to a communications network, this default connection is not interrupted.

If a previous default connection is already set up at the time of the setting up of the default connection, then the previous default connection is interrupted and replaced by the default connection being set up.

Referring to FIG. 4, when an application embedded in the communications device 20 triggers the setting up of a communications session with a remote server, such as for example a bank server, it informs the connection manager 207 thereof. for example by transmitting a message requesting the setting up of a connection at a step 401.

At a step 402, the connection manager 207 determines a state, activated or not activated, of a PDP or an EPS context associated with the type of service provided by the application.

If such a PDP or EPS context is activated, the connection manager transmits, at a step 403, a message to the application comprising an identifier of the network interface 206 through which the communications session can be set up.

If such a PDP or EPS context is not activated, the communications manager 207 triggers the activation of the PDP or EPS context corresponding to the service provided by the application at a step 404.

At a step 405, the connection manager 207 transmits a message to the application comprising an identifier of the network interface 206 through which the communications session can be set up.

The fact that other PDP or EPS contexts are activated in no way prevents the execution of steps 401 to 405. The communications manager 207 makes it possible to activate several PDP or EPS contexts simultaneously even when these contexts include different access point names and therefore correspond to connections set up with different IP networks.

In one embodiment of the method of transmission, the connection manager can determine that the PDP or EPS context to be activated requires a change of SIM card. In such an embodiment, all active PDP or EPS contexts are deactivated. Once the SIM card change has been made, the method of transmission is executed again from the step 301 to the step 405.

Referring to FIG. 5, when an application embedded in the communications device 20 triggers the closure of a communication session with a remote server, it informs the connection manager 207 thereof, for example by transmitting a message requesting closure of connection, at a step 501.

AT a step 502, the connection manager 207 determines the type of service provided by the application.

If the type of service provided by the application is the of the best effort type, the connection manager 207 allows the application to close the session at a step 503, for example by transmitting an authorization message. However, since the type of service is of the best effort type, the corresponding PDP or EPS context cannot be deactivated. Thus, the connection manager 207 does not trigger the deactivation of the PDP or EPS context and the associated default connection is not interrupted.

If the type of service provided by the application is of a type other than the best effort type, the connection manager 207 determines whether the PDP or EPS context corresponding to the type of service is activated, at a step 504.

If the PDP or EPS context corresponding to the type of service is not activated, the connection manager 207 allows the application to close the session at a step 505.

If the PDP or EPS context corresponding to the type of service is activated, the connection manager 207 determines, at a step 506, whether another application providing the same type of service has an active communications session, i.e. that it is transmitting data through the associated connection.

If the connection is used by another application, the connection manager 207 allows the application to close the session at a step 507, for example by transmitting an authorization message. However, the corresponding PDP or EPS context cannot be deactivated since another application is transmitting data through the corresponding connection.

Thus, the connection manager 207 does not trigger the deactivation of the PDP or EPS context and the associated connection is not interrupted.

If the connection is not used by another application, the connection manager 207 allows the application to close the session at a step 508, for example by transmitting an authorization message.

At a step 509, the connection manager 207 deactivates the corresponding PDP or EPS context and the associated connection is interrupted.

The invention claimed is:

1. A method comprising:
transmitting data by a telecommunication device located in a first telecommunication network and attached to a first telecommunication gateway, which is a Gateway General Packet Radio Service (GPRS) Support Node (GGSN), a Serving GPRS Support Node (SGSN) or a telecommunication Serving Gateway, said first telecommunication gateway interconnecting the first telecommunication network and a second telecommunication network, the transmitting comprising:
   setting up at least a first connection between the telecommunication device and the first telecommunication gateway by activating a Packet Data Protocol (PDP) context or an Evolved Packet System (EPS) context corresponding to a first set of parameters comprising an identifier of the first telecommunication gateway and parameters relating to the transmission of the data according to a first type of service, called a best effort service, said first connection being active as long as the telecommunication device remains connected to the first telecommunication network,
   a phase of transmission of data according to the first type of service through said first connection set up between the telecommunication device and the first gateway, and
   during the phase of transmission, setting up at least a second connection between the telecommunication device and a second telecommunication gateway, which is a GGSN or a PDN gateway, said second telecommunication gateway interconnecting the first telecommunication network and a third telecommunication network by activating a PDP context or an EPS context corresponding to a second set of parameters comprising an identifier of the second telecommunication gateway and parameters relating to the transmission of data according to a second type of service,
   wherein the parameters relative to the transmission of data relative to the second type of service comprise at least one parameter representative of a type of service associated with the data to be transmitted comprising an identifier of a transport protocol in accordance with which the data are to be transmitted.

2. The method of transmission according to claim 1, wherein the parameter representative of a type of service associated with the data to be transmitted comprises an identifier of a level of quality of service associated with the data to be transmitted.

3. The method of transmission according to claim 1, wherein the parameters relating to the transmission of the data relative to the first type of service and of data relative to the second type of service comprise at least one identifier of an operator controlling the first telecommunications network.

4. The method of transmission according to claim 1, wherein the parameters relative to the transmission of data relative to the first type of service and of data relative to the second type of service comprise at least one identifier of a slot made in the telecommunication device and in which a Subscriber Identification Module (SIM) card is to be inserted.

5. A telecommunication device situated in a first telecommunication network and comprising:
a processor; and
a non-transitory computer-readable medium comprising instructions stored thereon which when executed by the processor configure the telecommunication device to:
   set up at least a first connection between the telecommunication device and a first telecommunication gateway, which is a Gateway General Packet Radio Service (GPRS) Support Node (GGSN), a Serving GPRS Support Node (SGSN) or a telecommunication Serving Gateway, said first telecommunication gateway interconnecting the first telecommunication network and a second telecommunication network by activating a Packet Data Protocol (PDP) context or an Evolved Packet System (EPS) context corresponding to a first set of parameters comprising an identifier of the first telecommunication gateway and parameters relating to the transmission of data according to a first type of service, called a best effort service, said first connection being active as long as the telecommunication device remains connected to the first telecommunication network;
   transmit data according to the first type of service through the first connection set up with the first telecommunication gateway; and
   set up at least a second connection with a second telecommunication gateway, which is a GGSN or a PDN gateway, said second telecommunication gateway interconnecting the first telecommunication network and a third telecommunication network by activating a PDP context or an EPS context corresponding to a second set of parameters comprising an identifier of the second telecommunication gateway and parameters relating to the transmission of data according to a second type of service, the first connection being still active,
   wherein the parameters relative to the transmission of data relative to the second type of service comprise at least one parameter representative of a type of service associated with the data to be transmitted comprising an identifier of a transport protocol in accordance with which the data are to be transmitted.

6. A payment terminal situated in a first telecommunication network comprising at least one telecommunication device comprising:
a processor; and
a non-transitory computer-readable medium comprising instructions stored thereon which when executed by the processor configure the telecommunication device to:
   set up at least a first connection between the telecommunication device and a first telecommunication gateway, which is a Gateway General Packet Radio Service (GPRS) Support Node (GGSN), a Serving GPRS Support Node (SGSN) or a telecommunication Serving Gateway, said first telecommunication gateway interconnecting the first telecommunication network and a second telecommunication network by activating a Packet Data Protocol (PDP) context or an Evolved Packet System (EPS) context corresponding to a first set of parameters comprising an identifier of the first telecommunication gateway and parameters relating to the transmission of data according to a first type of service, called a best effort service, said first connection being active as long as the telecommunication device remains connected to the first telecommunication network;

transmit data according to the first type of service through the first connection set up with the first telecommunication gateway; and set up at least a second connection with a second telecommunication gateway, which is a GGSN or a PDN gateway, said second telecommunication gateway interconnecting the first telecommunication network and a third telecommunication network by activating a PDP context or an EPS context corresponding to a second set of parameters comprising an identifier of the second telecommunication gateway and parameters relating to the transmission of data according to a second type of service, the first connection being still active, wherein the parameters relative to the transmission of data relative to the second type of service comprise at least one parameter representative of a type of service associated with the data to be transmitted comprising an identifier of a transport protocol in accordance with which the data are to be transmitted.

7. A non-transitory computer-readable medium comprising program code instructions stored thereon for implementing a method of transmission of data when the instructions are executed by a processor of a telecommunication device situated in a first telecommunication network, where in the instructions configure the telecommunication device to:

set up at least a first connection between the telecommunication device and a first telecommunication gateway, which is a Gateway General Packet Radio Service (GPRS) Support Node (GGSN), a Serving GPRS Support Node (SGSN) or a telecommunication Serving Gateway, said first telecommunication gateway interconnecting the first telecommunication network and a second telecommunication network by activating a Packet Data Protocol (PDP) context or an Evolved Packet System (EPS) context corresponding to a first set of parameters comprising an identifier of the first telecommunication gateway and parameters relating to the transmission of the data according to a first type of service, called a best effort service, said first connection being active as long as the telecommunication device is connected to the first telecommunication network, implement a phase of transmission of data according to the first type of service through said first connection set up between the telecommunication device and the first telecommunication gateway, and during the phase of transmission, set up at least a second connection between the telecommunication device and a second telecommunication gateway, which is a GGSN or a PDN gateway, said second telecommunication gateway interconnecting the first telecommunication network and a third telecommunication network by activating a PDP context or an EPS context corresponding to a second set of parameters comprising an identifier of the second telecommunication gateway and parameters relating to the transmission of data according to a second type of service, wherein the parameters relative to the transmission of data relative to the second type of service comprise at least one parameter representative of a type of service associated with the data to be transmitted comprising an identifier of a transport protocol in accordance with which the data are to be transmitted.

* * * * *